US005688014A

United States Patent [19]

Kot

[11] Patent Number: 5,688,014

[45] Date of Patent: Nov. 18, 1997

[54] CLAMP HAVING SELF-LIMITING INTERNAL OVERSTRESS RELIEF

[76] Inventor: Norbert J. Kot, 955 S. Edwards St., Brookfield, Wis. 53005

[21] Appl. No.: 338,346

[22] Filed: Nov. 14, 1994

[51] Int. Cl.[6] .................. B25B 5/12; B25J 15/08

[52] U.S. Cl. .................. 294/115; 269/32; 269/224; 269/228; 294/88; 294/99.1; 294/104

[58] Field of Search .................. 294/86.4, 88, 99.1, 294/100, 104, 106, 110.1, 115; 269/32, 34, 224, 228

[56] References Cited

U.S. PATENT DOCUMENTS 2,179,153 11/1939 Jones .
2,369,362 2/1945 Marziani .
3,204,947 9/1965 Sendoykas .................. 269/228 X
3,302,943 2/1967 Mericle, Jr. .
3,347,542 10/1967 Mericle .................. 269/288 X
3,497,255 2/1970 Sindelar .................. 294/88
3,512,824 5/1970 Bautz et al. .................. 294/115
3,614,151 10/1971 Shadle .................. 294/104
3,697,060 10/1972 Kulson .................. 269/228
3,782,162 1/1974 Bullard .................. 294/104 X
3,799,533 3/1974 Malott .
3,801,091 4/1974 McPherson et al. .
3,819,171 6/1974 Sendoykas et al. .
4,291,909 9/1981 Coatantiec .................. 294/88
4,473,249 9/1984 Valentine et al. .................. 294/104 X
4,540,211 9/1985 Masserang .................. 294/99.1 X
4,838,306 6/1989 Horn et al. .
4,905,975 3/1990 Ruegg .
5,171,004 12/1992 Berchtold .

FOREIGN PATENT DOCUMENTS 1231498 9/1960 France .

*Primary Examiner*—Johnny D. Cherry
*Attorney, Agent, or Firm*—Ryan, Maki, Mann & Hohenfeldt

[57] ABSTRACT

A clamp has a clamping arm pivotally mounted to a base frame for swinging between clamping and unclamping positions. An actuator, such as a pneumatic cylinder, provides bidirectional forces for swinging the arm. The arm is driven by the actuator by way of an articulated linkage system including at least one spring link and one rigid link. The spring link preferably has a C-shape.

20 Claims, 4 Drawing Sheets

CLAMP HAVING SELF-LIMITING INTERNAL OVERSTRESS RELIEF

BACKGROUND OF THE INVENTION

The invention disclosed herein pertains to a power-operated toggle clamp.

Conventional toggle clamps comprise at least one clamping arm that is pivotally connected to a base support. A pair of toggle links are connected to each other at a pivot point with the end of one of the links pivotally connected to the arm and the end of the other link pivotally connected to the base support. The force for swinging the arm into clamping condition and for releasing the arm from clamping condition is applied where the ends of the links are pivotally connected. The clamping arm contacts and begins to apply clamping force to the object slightly before the pivots of the links and the links themselves become aligned or at dead center. At alignment condition, the clamping force on the article to be clamped is at a maximum. Then, under a continued driving force, the links toggle or pass one another and lock so the article will be held even if the driving force is relieved.

It is well known that as the links toggle, a point is reached and passed at which the compressive and tension stresses in the links and clamp arm are theoretically infinitely large.

The internal stress in the links and the clamping arm is relieved to some extent, however, by the links and the clamping arm distorting and bending which is possible because the metal parts of the clamp are slightly elastic. In other words, the inherent elasticity of the parts of the clamp that are overstressed saves the parts from fracturing. One undesirable consequence of the great unpredictable internal stress occurring at the toggle point is that the pins connecting the links and the pin on which the clamp arm swings are subject to a powerful shearing force. Since there is no motion between the pivot points and the links at the toggle point, the high shearing or bearing stress causes rapid wear of the pins and/or in the links, which are journaled on the pins. If the size of the article being clamped varies by as little as 0.015 inch (0.38 mm) the clamping force can vary by 25%–50%. If the article size exceeds specifications, internal stress of the clamp parts is even greater. If the article size is under specification, the article may slip in the clamp which can result in damage to property or injury to a person in an industrial setting. Thus, prior conventional clamps develop clamping forces which are not completely predictable nor controllable.

SUMMARY OF THE INVENTION

Objectives of the invention are to provide in a toggle clamp mechanism a resilient or elastic element that yields to prevent occurrence of excessive stress that might strain parts of the clamp beyond their limit, to minimize wear and, importantly, to assure that the clamp can be unlocked from an overtoggled locked state even though the fluid operated actuator can exert less force when driving the clamp to an unlocked state than when driving to a locked state.

Another objective of the invention is to provide a clamp that is capable of clamping a series of articles with substantially equal force even though the dimensional tolerance among the articles varies.

According to one implementation of the principles of the invention, the new clamp comprises a support frame and a swingable clamping arm. A slider is mounted for moving bi-directionally along a linear guide track on the frame. The slider is pushed and pulled on the guide track, preferably, with a fluid work cylinder or an electromagnetic operator although the slider could be moved manually in low clamping power clamps. A link has one of its ends pivotally connected to the slider, and an opposite end pivotally connected to the clamping arm, using part of the arm beyond its pivot axis as a lever arm for swinging the clamping arm angularly between clamp and unclamp positions. The clamp arm pivots on a pin that extends through aligned elongated slots or oversized holes in spaced apart members of the frame. A spring is incorporated in the clamp actuating mechanism somewhere between where the driving force for the clamp is applied and where the clamp applies a holding force. In the preferred embodiment, springs having a predetermined spring constant support the arm pivot pin nonrotatably from the frame so when the arm clamps an over-sized object that might overstress parts of the clamp, the springs yield to allow the arm pivot pin to shift in the elongated slots in the frame to prevent development of excess internal stress in the parts of the clamp. Hence, the selected spring characteristics govern the load rating of the clamp and provide means for controlling the clamp in a predictable way.

In a more general expression of the invention, a toggle clamp has a pivotably mounted clamping arm pivotable in one direction to clamp an object and in an opposite direction to clamp an object. A force generating device drives a force transmitting member bidirectionally and an articulated toggle link arrangement, including at least one spring member, connects the force generating device to the clamping arm. In some implementations disclosed herein the articulated linkage arrangement is such that the arm pivot pin does not have to yield in a slot.

How the foregoing objectives and other objectives and features of the invention are achieved and implemented will be evident in the ensuing more detailed description of various implementations of the inventive concept which will now be set forth in reference to the accompanying drawings.

DESCRIPTION OF A PRIOR CLAMP

Figure 1:
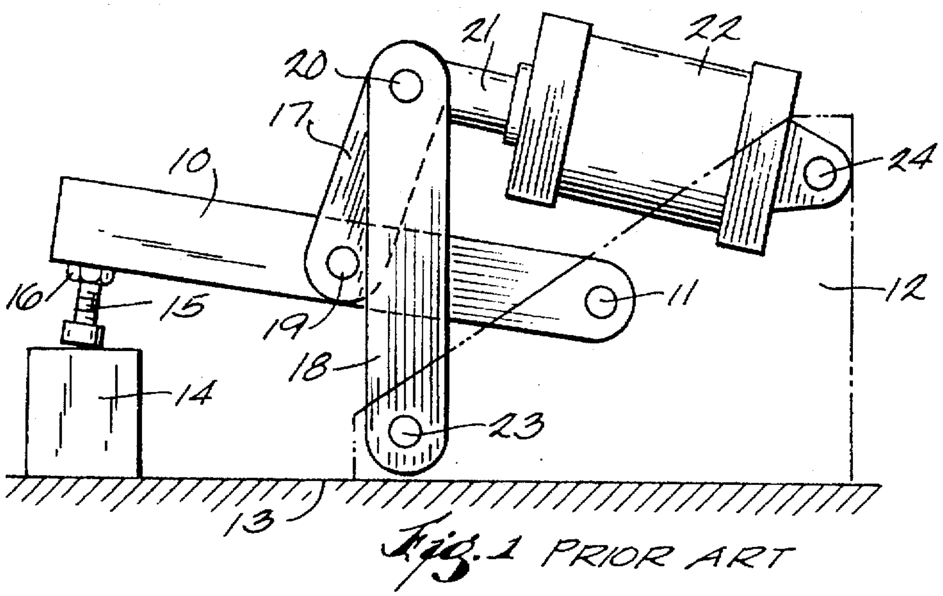
Fig. 1 PRIOR ART
FIG. 1 is a diagrammatic side-elevational view of a typical known type of hold-down clamp that is useful for explaining problems that exist in prior art clamps.

Before describing the new and improved toggle clamp the conventional clamp depicted in FIG. 1 will be described. It affords an opportunity for explaining problems that exist in preexisting toggle clamps. This clamp comprises a hold-down clamping arm 10 that is pivotally connected by means of a pin 11 to a frame 12. The frame may be fixed to a flat surface 13 of a machine, for example. Clamping arm 10 is applying a hold-down force to an article 14. The amount of clamping force on the article depends partially on the adjustment of an adjustable clamping bolt 15. Clamping bolt 15 is threaded into arm 10 and can be secured in an adjusted position with a lock nut 16. The user of a clamp of this type can attest that the clamp is incapable of compensating for even small errors or tolerances in the nominal size of the article 14. In other words, as will be explained, in a case such as where the article 14 is larger than the size for which the clamp is calibrated, the clamping force can increase so much that the parts of the clamp will be under a theoretically near infinitely high tensile or compressive stress.

Clamping arm 10 in FIG. 1 is driven into clamping condition by force transmitted through a minor toggle link 17 and a major toggle link 18. Link 17 has one end pivotally connected by means of a pin 19 to clamping arm 10 and an opposite end pivotally connected by means of a pin 20 to the end of a piston rod 21 which extends from a fluid actuator cylinder 22. Major link 18 has its upper end pivotally connected to piston rod 21 along with a minor link 17. The opposite or lower end of major link 18 is pivotally connected by means of pin 23 to frame member 12. The actuator cylinder 22 can pivot through a small angle on a pin 24 that pivotally connects the cylinder to frame member 12.

In FIG. 1, maximum clamping force on article 14 is not being applied as yet, but the maximum force will be applied when piston rod 21 is extended a little more to the left such as to force the minor and major links 17 and 18 into alignment at which time all three of the pins 19, 20 and 23 lie on the same straight line. Then, further extension of piston rod 21 toggles minor link 17 past major link 18 to thereby lock the arm 10 against releasing the article. It will be evident that if the adjustment bolt 15 is adjusted to engage an article that has a height meeting nominal size or specification, but the article is slightly oversize, excessive forces will occur at the moment of toggle. The excessive forces can only find relief by tending to bend arm 10 and piston rod 21, by stretching the link, and developing huge shear forces on pins 11, 19, 20, 23 and 24. This causes the pins to wear so that the useful life of the clamp ends prematurely. On the other hand, if the article 14 is undersize by a small amount, the article can slip away from under the clamping arm. This type of clamp can cope with only tiny tolerances in article size.

One of the peculiarities known to users of clamps such as the clamp shown in FIG. 1 is that when the piston rod 21 extends further to the left, pin 20 toggles over dead center, link 17 angulates to the left rather than to the right and the clamp locks but it will not unlock. The reason is that the fluid pressure available to the piston in the cylinder 22 is the same for clamping or locking and unclamping or unlocking the clamp. The area of the piston on the side of the piston that extends the piston rod 21 to effect clamping is greater than the area of the opposite side of the piston by an amount equal to the cross sectional area of the attached piston rod. Thus, it happens that the lesser force available for unclamping when fluid pressure is constant is insufficient to toggle the linkage oppositely over dead center and the clamp stays locked. The new clamp overcomes this problem.

DESCRIPTION OF A PREFERRED EMBODIMENT

Figure 2:
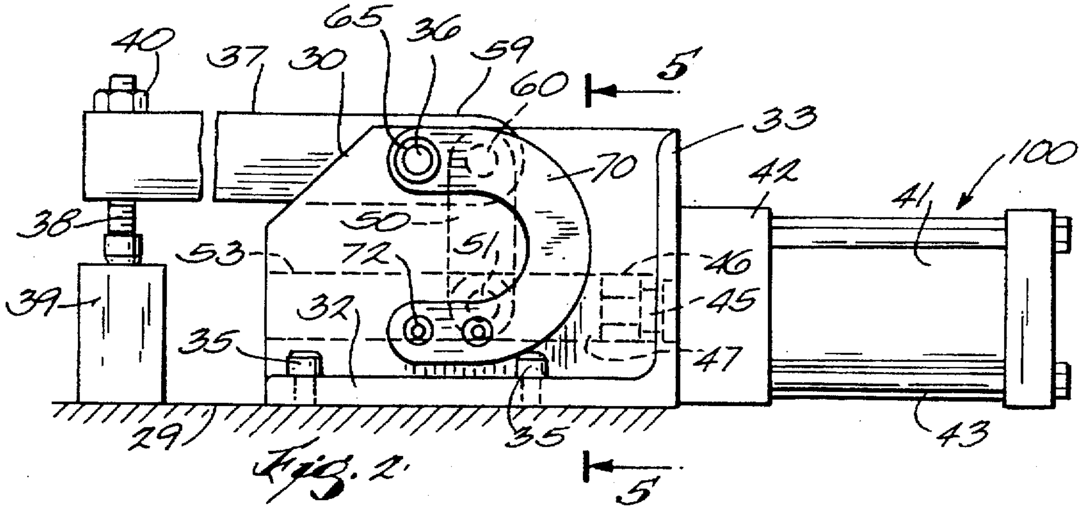
FIG. 2 is a side-elevational view of one implementation of the new hold-down clamp, employing the principles of the invention, wherein an article is being clamped.
Figure 3:
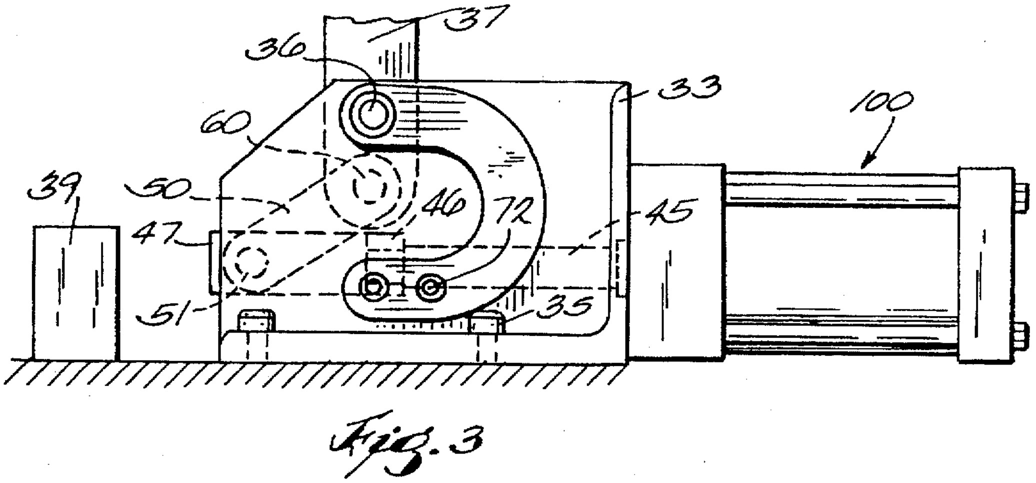
FIG. 3 shows the hold-down clamp of the preceding FIGURE wherein the article is unclamped.
Figure 4:
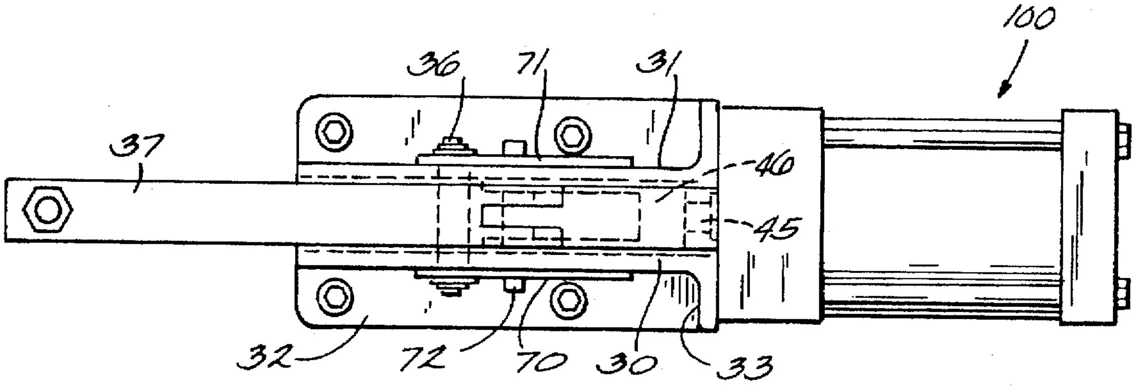
FIG. 4 is a top plan view of the hold-down clamp in clamping condition and corresponding with FIG. 2.

Attention is now invited to the embodiment of the improved hold-down clamp that is illustrated in FIGS. 2–5 and employs the principles of the invention. The hold-down clamp in these FIGURES comprises a frame including two upstanding side plate members of which member 30 is visible in FIGS. 2–5 and its parallel and congruent counterpart 31 is visible in FIGS. 4 and 5. Typical side plate 30 has an integral base flange 32 and an integral upstanding flange 33 at a right angle to the base flange and to the side plate 30. Base flange 32 may be secured to a machine bed 29, for example, by means of machine screws such as the one marked 35. A pin 36 on which a clamping arm 37 pivots spans across the space between the parallel side plates 30 and 31 as shown in FIGS. 2–4. Viewing FIGS. 2 and 3, for instance, one may see that a clamping arm 37 is pivotally mounted for pivoting or swinging between clamped and unclamped positions, respectively. In FIG. 2, clamping arm 37 is in clamping position wherein it is applying a clamping force, transmitted through adjustment bolt 38, to an article 39. The threaded adjustment bolt is screwed into the end of clamp arm 37 and is locked against unintended rotation by tightening a lock nut 40. In a practical application, adjustment bolt 38 will be screwed into or out of clamping arm 37 by the right amount for holding the article 39 as securely as is needed when the article meets the height specification precisely. How the new clamp design relieves excessive strain within its parts when the article size is above specification or above nominal size without sacrificing clamping force will be explained shortly hereinafter.

Clamping arm 37 is swung to clamping position as in FIG. 2 and to unclamping position as in FIG. 3 using the force obtained from any suitable actuator such as the fluid pressure responsive actuator that is designated generally by the numeral 100. The actuator has a work cylinder 41 secured to an adapter member 42 by bolts 43. The member can be fastened to upstanding flanges 33 of the base by welding or other suitable means. Cylinder 41 contains a piston, not shown, that moves axially of the inside of the cylinder in response to either side of the piston being exposed to pressurized fluid while the opposite side is exhausted or relieved of pressure.

Figure 5:
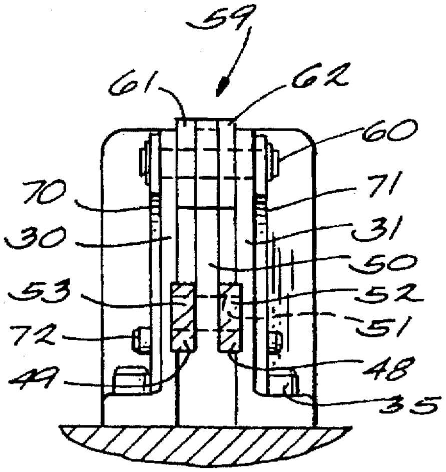
FIG. 5 is a rear-elevational view of the hold-down clamp looking through a vertical plane defined by the line 5—5 in FIG. 2.

A piston rod 45 projects by a small amount out of cylinder 41 in FIG. 2 and is threaded to one end 46 of a unitary slider 47 that is slotted on the other end to define two sides 48 and 49 of the slider. The two sides of the slider 47 are shown in section in FIG. 5 and are marked 48 and 49. The space between slider sides 48 and 49 receives the lower end of a toggle link 50 which pivotally connects between the slider sides 48 and 49 by way of a pin 51 whose opposite ends fit tightly in sides 48 and 49. The slider 47 travels reciprocably in tracks constituted by linear guide grooves or channels 52 and 53 which are milled in the inside faces of side base plates 30 and 31, respectively. One end 59, marked in FIGS. 2 and 5, of the clamp arm 37 is also slotted or bifurcated to define opposite sides 61 and 62 of the slot for receiving the upper end of toggle link 50 as can be seen in FIG. 5 particularly well. The upper end of toggle link 50 is pivotally connected to clamp arm 37, particularly in its slotted end by way of a pin 60 which passes through the clamp arm freely so the arm can swing on the pin. Opposite ends of pin 60 are anchored tightly in side walls 61 and 62 of the slot at the end of clamp arm 37.

Attention is focused again on FIG. 2, and particularly on pin 36 on which the clamp arm 37 pivots. As indicated by the dashed lines above pin 36, the holes 65 in side plates 30 and 31 of the base through which pin 36 extends are elongated holes or slots that allow the pin 36 on which the clamp arm pivots, to yield upwardly in opposition to the downward biasing force developed by a pair of identical C-shaped springs 70 and 71 which are congruent and are positioned on opposite outside faces of base side walls 30 and 31 as can be seen in FIG. 5. These springs actually support pin 36 on which the clamping arm 37 pivots. Spring 70 interfaces with side plate 30 and is in the forefront of side plate 30 in FIGS. 2, 3 and 4 while spring 71 interfaces with side plate 31. The lower end of C-shaped spring 70 is fastened to side plate 30 with machine screws such as the one marked 72 and the opposite spring is similarly fastened to side plate 31.

In FIG. 2, the slider 47 is drawn or retracted sufficiently far to the right in guide channels 52 and 53 compared to the FIG. 3 position to establish link 50 in a vertical position wherein it forces clamping arm 37 in a counter-clockwise direction about the axis of pin 36. As the link 50 approached vertical, it pivoted clamp arm 37 into clamping position as shown. Assume for demonstration purposes that the article 39 being clamped or held down is accurately sized and adjustment bolt 38 is adjusted so that article 39 is clamped with a predetermined desired force. In such case, the C-springs 70 and 71 hold pin 36 down in the slot or elongated holes 65.

Assume now that the next in a series of articles 39 is slightly oversized such that the parts of the clamp would be overstressed and distorted during clamping if the clamp were a conventional toggle clamp. In the new clamp, however, with the self-limiting stress relief feature involving use of C springs 70 and 71, the internal stresses are transmitted through the springs. The springs simply expand or open to relieve the stress which they can do because of the elongated slot or holes 65 for the arm pivot pin 36 having been provided in side plates 30 and 31.

It should be evident from the foregoing description of the clamp operation that mounting the clamping arm pivot pin 36 on springs allows control over the stresses developed in the components of the clamp. In practice, applications occur where different clamping forces are required for articles that have different characteristics and dimensional tolerances. In such cases the appropriate clamping force is easily obtained by simply substituting C-springs that have proper spring constants and force characteristics which may be accomplished by increasing or decreasing the thickness of the C-springs, making the springs of metals that have different properties, or making the spring of a different shape so as to provide a non-linear spring constant, for example.

Figure 6:
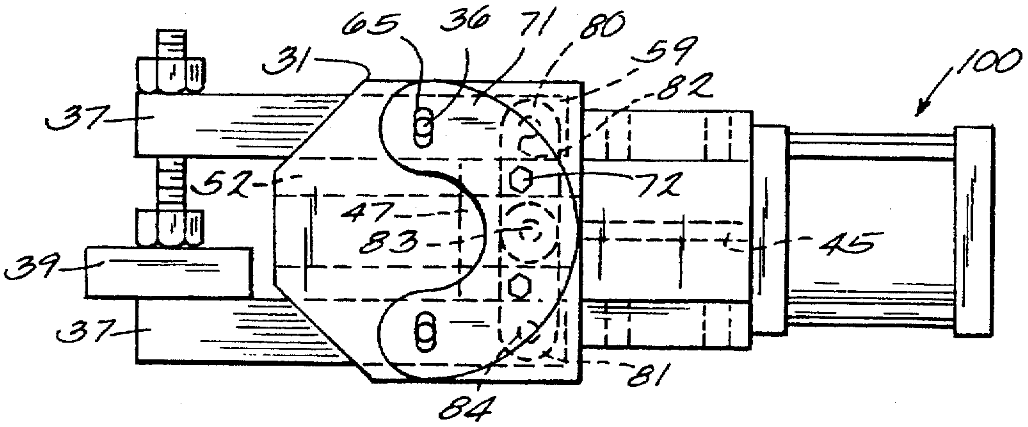
FIG. 6 is a side-elevational view of a double arm clamp in which the principles underlying the invention are employed.

To set up or calibrate the clamp according to the FIGS. 2–5 embodiment and the next to be discussed FIG. 6 embodiment too, a sample article 39 having a thickness that meets specification or is very close to the specified thickness is selected and clamped. Bolt 38 is then adjusted inwardly and outwardly of the clamping arm 37 until the clamping arm pivot pin 36 is centered in the elongated holes 65 in the side plates 30 and 31 of the clamp frame. The small free space above and below pin 36 allows the spring to flex open if article 39 has slightly greater than specified thickness or to flex closed if the article thickness is slightly less than that which is specified. For handling elongated articles 39, several clamps may be fastened to a balance beam, not shown, hanging from a crane hook. In such cases all of the clamps are calibrated for stress and strain control as just described.

FIG. 3 shows the clamp arm opened to release article 39. To open the clamp from its FIG. 2 clamped condition, the actuator 40 is caused to push the slider 47 outwardly or to the left as has already happened in FIG. 3. This angulates the toggle link 50 to transmit a rotational or swinging force to the clamp arm 37, as shown.

Another implementation of the inventive concept is illustrated in the FIG. 6 clamp. The reference numerals assigned to parts in the FIGS. 1–5 embodiment are assigned to the functionally corresponding parts in FIG. 6. The FIG. 6 embodiment uses a frame comprised of two side plates, one of which 31 is visible. It will be understood that there is a similar plate, not visible, arranged in parallel to and spaced from plate 31. The clamp is designed for holding and carrying an article 39 so the clamp has two swingable clamp arms 37, 37. Clamp arms 37 swing in and out of clamping condition on pivot pins 36. Pins 36 fit tightly through holes in C-shaped springs, one of which, 71, is visible in the drawing and the other of which is behind it on side plate 31 and is, therefore, not visible. The C-springs are fastened in their mid regions to the side plates by means of screws such as the one marked 72. Pivot pins 36 pass freely through elongated holes or slots 65 in the side plates so the pins can float up and down in the holes to compensate for stress variations. There is no freeplay or clearance between the non-rotatable pins 36 and the holes in the clamping arms through which the pins 36 pass. Thus, clamping arms 37 are supported from the C-shaped springs.

As in the previously discussed embodiment, the inside surface of the side plates contain parallel and congruent linear guide grooves or tracks which are designated generally by the numeral 52. A slider 47 is arranged to slide back and forth in or on the tracks. The slider is connected to a piston rod 45 extending from a fluid actuator 100. The ends of clamping arms 37 have lengthwise extending slots 59. In other words, clamping arms 37 are bifurcated at their ends. A pair of toggle links 80 and 81 (which are new reference numerals) having rounded ends are used in this embodiment. Link 80 extends into the slotted end of arm 37 and is pivotally connected at one end to the arm by way of a pin 82 and is also pivotally connected to the slotted slider 47 at its other end by way of a pin 83. One end of the other link 81 is pivotally connected to the slider by way of pin 83 and is pivotally connected to the other arm 37 by way of a pin 84.

In FIG. 6, the slider 47 is retracted such as to pull the links 80 and 81 past toggle position, or in other words, slightly more than the distance required to cause the links to lie on a common straight line. Under this condition, arms 37 clamp the article 39 tightly, assuming that the article has a size or dimension near the dimension for which the clamp is calibrated. If article 39 were oversized within limits, the C-shaped springs 71 and its counterpart deflect so the springs take up the excessive stress which would otherwise occur in the links and arms. Deflection of the springs is possible because the pins 36, 36 on which the arms 37 pivot are able to shift in the elongated or slotted holes 65 in the side plates of the clamp frame. Thus, the springs serve as the clamping force controlling links.

The FIG. 7 implementation of the principles of the new clamp will now be discussed. The frame used in this embodiment is basically similar to the frame used in the FIGS. 1–5 embodiment. Where possible, all parts will be given the same reference numerals as in the preceeding embodiments.

The base comprises two upstanding parallel side plate members of which member 30 is visible and is in the forefront of its parallel counterpart. Each side member 30 has an integral base flange 32 and an integral rear flange 33 which is perpendicular to member 30 and base flange 32. The base is anchored to a machine bed, for example, with machine screws such as the one marked 35.

Figure 7:
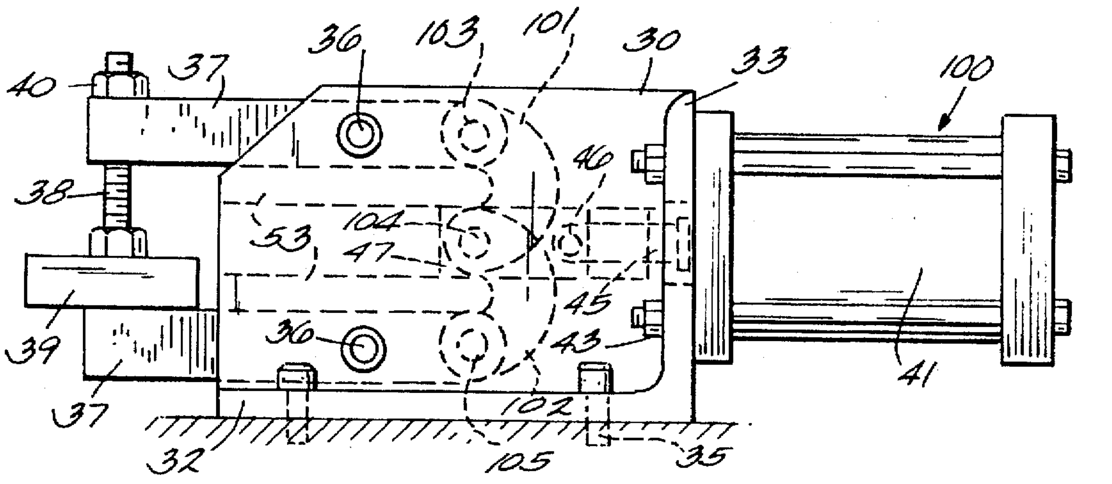
FIG. 7 is a diagrammatic side-elevational view of an alternative embodiment of the new clamp.

The FIG. 7 embodiment comprises two clamping arms 37,37. The arms pivot on pins 36,36 which extend without any significant clearance through holes in the side plate 30 and the pins and the distance between the side plate. The pins 36 are held against axial shifting with snap rings which are shown as circles concentric to the pins. Note that pins 36 do not reside in elongated holes as they do in the FIG. 2 embodiment so the pins cannot yield in any direction. The clamp is depicted as having been operated to a clamping condition where it is gripping a work piece or article 39 tightly. One clamping arm 37 has an adjustment bolt 38 threaded into it and a jam nut 40 is tightened to assure that the adjustments of bolt 38 relative to the arm remains where the bolt is set. In a practical application, adjustment bolt 38 is screwed in or out of the clamping arm 37 by the right amount for holding article 39 as securely as is needed when the article meets the specified height or thickness dimension accurately. If any article handled by the clamp subsequently is oversize or undersize, the clamp automatically compensates for it by means of the spring link.

The clamp in FIG. 7 is actuated between the clamping mode, as shown, and unclamping mode by means of a conventional pneumatic actuator 100 comprised of a cylinder 41 in which there is a piston that is not visible. A piston rod 45 extends from the cylinder and the rod makes a clevis connection 46 to a slider member 47. The clamp actuator 100 is secured to the rear flange 33 on the clamp frame with four bolts such as the bolt marked 43. The slider member 47 is guided for reciprocation in tracks, particularly, channels which are milled lengthwise of the clamp frame in the upstanding frame side such as the one marked 30.

In FIG. 7 the articulated driving connection between the slider member 47 and the end of clamping arm 37 is constituted by two pairs of C-springs which also serve as clamping arm swinging links. Spring 101 is a member of one of the pairs and appears in the drawing congruent to its mate which is behind it. Spring 102 is a member of the other of the pairs and is congruent with its mate which is behind it. Spring link 101 and its mate has corresponding upper ends pivotally connected by way of pin 103 to clamping arm 37 and corresponding lower ends pivotally connected by a pin 104 to slider member 47. Spring link 102 and its mate have their corresponding ends pivotally connected by pin 104 to slider member 47 and have their lower ends pivotally connected to the lower clamping arm 37 by pin 105.

In FIG. 7, the slider 45 is presently retracted toward actuator 100. Thus, clamping arms 37 are exerting a clamping force on article 39. The centers of pins 103, 104 and 105 all lie on or nearly on the same vertical line. That is, pins 103 and 105 have not toggled past top and bottom dead center, respectively. It is possible that clamping bolt 38 is adjusted so that it made forceful contact with article 39 before slider 47 reached the limit of its retraction. If the spring links 101 and 102 were straight links with little elasticity as in conventional toggle clamps, the links would be placed under excessive stress under the circumstances recited in the preceding sentence and the pins 103, 104 and 105 would be subjected to intense compressive and shearing stress. In the FIG. 7 clamp, this overstress problem does not arise because the C-spring pairs 101 and 102 flex to relieve the overstress condition.

Calibration of the clamp for stress and strain control is obtained to a large extent by proper adjustment of bolt 38. Adjustment is made in expectation that the clamp will be assigned the duty of repeatedly clamping and releasing a series of articles that have the same nominal thickness between the clamping arms although some of the articles may be 0.015 of an inch (0.38 mm) undersize or oversize, by way of example and not limitation. The calibration procedure involves selecting a sample article 39 having a thickness that is close to or near the specified thickness and clamping it using whatever pressure is available for operating the pneumatic cylinder 100. The bolt 38 is then screwed into or out of clamping arm 37 until the grip of the clamp is great enough to hold the standard near zero thickness tolerant article 39 safely. Then, bolt 38 is unscrewed slightly to increase the clamping force, but this is balanced by the C-springs flexing to a more closed condition. Thus, when the clamp is clamping an undersize article later, the springs will flex and adjust to different clamping thicknesses.

Figure 8:
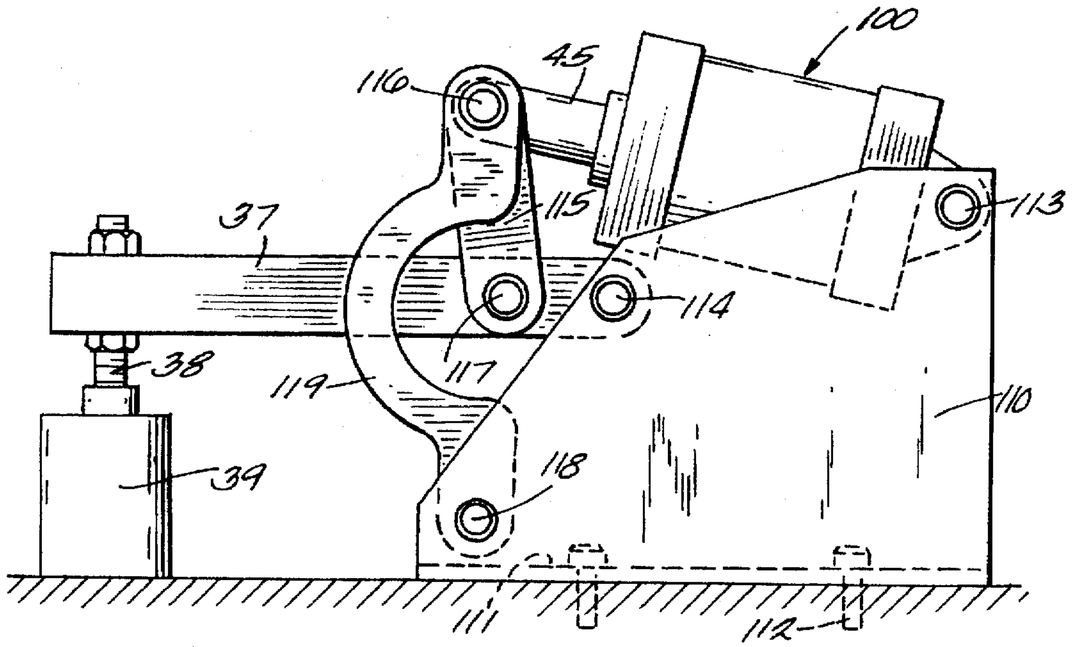
FIG. 8 is a diagrammatic side-elevational view of another alternative embodiment of the invention.

In the FIG. 8 embodiment of the stress and strain controllable clamp, parts that are similar to previously discussed embodiments are given the same reference numerals. Thus, the clamping arm is designated by 37, the adjustment bolt by 38, the article being clamped by 39, the fluid actuator by 100 and the piston rod by 45. The frame for the clamp in FIG. 8 is comprised of a plate formed in a U-shape and thus having a pair of upstanding side members, the one of which in the foreground is marked 110. A similar side member is behind member 110 and is joined to the member 110 by the bottom member 111. The frame is mounted to an object by way of screws 112. Fluid actuator 100 is mounted to the frame with a pivot pin 113 that stands across the space between side member 110 of the frame and its hidden counterpart. The actuator can swing on pin 113. Clamp arm 37 is pivotable on a pin 114 that is set inside member 110 and in its counterpart behind it. A congruent pair of stiff links 115 are pivotally connected at their upper corresponding ends to the piston rod 45 with a pin 116 and at their opposite ends to clamping arm 45 with a pin 117. A pair of congruent C-shaped springs 119, which may have linear or non-linear but identical spring constants, are connected between pin 116 and pin 118. Pin 118 has one end positioned in the side frame member 110 and its other end in the counterpart of member 110 behind it.

Piston rod 45 is extended in FIG. 8 to put the clamp in the clamping state. In this case, a straight line drawn vertically through the center of pins 117 and 118 would not pass through the center of pin 116. In other words, pin 116 and the angulated link 115 have toggled over top dead center. There was an instant as clamping arm 37 was swinging counterclockwise toward clamping position that link 115 was near vertical and then vertical which was possible because actuator 100 can pivot on pin 113. When the link 115 is vertical, bolt 38 can make first contact with article 39. C-springs 119 yield or become elongated at this time while they store energy and relieve stress on the links and pins. After toggling over top dead center, the springs are in a compressed state for limiting the force that can be applied by the actuator 100.

The articulated resilient linkage in FIG. 8 affords an opportunity to explain how the clamp lock-up, that is, the failure of the clamp to open that occurs in conventional clamps, is prevented in accordance with the invention. It will be evident that to close the clamp, as shown, the side of the piston, in the actuator 100 opposite of the side of the piston on which the piston rod 45 is fastened, is pressurized. Since the air pressure is held constant in industrial systems, it will be evident that more force can be developed for extending piston 45 for closing the clamp than can be developed for retracting the piston rod to open the clamp because of the lesser area on the side of the piston to which the piston rod 45 is attached. Thus, in previous clamp designs such as the FIG. 1 design, after the links have toggled over center, the force available for getting the piston rod to retract and for getting the links to toggle back over dead center is often insufficient so the clamp will not release the article. In clamps claimed herein, the springs yield when unclamping so the force available from the actuator can be less for affecting unclamping than for clamping and the clamp does not lock up.

Figure 10:
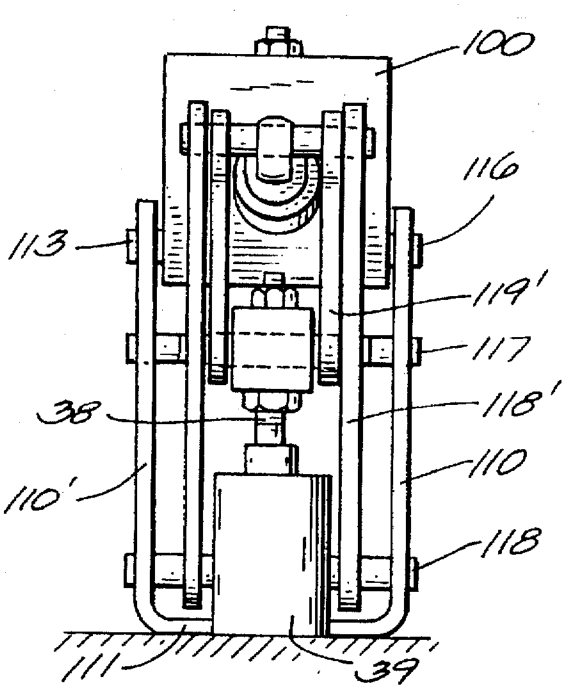
FIG. 10 is a front end elevational view of the clamp depicted in the preceding FIGURE.
Figure 9:
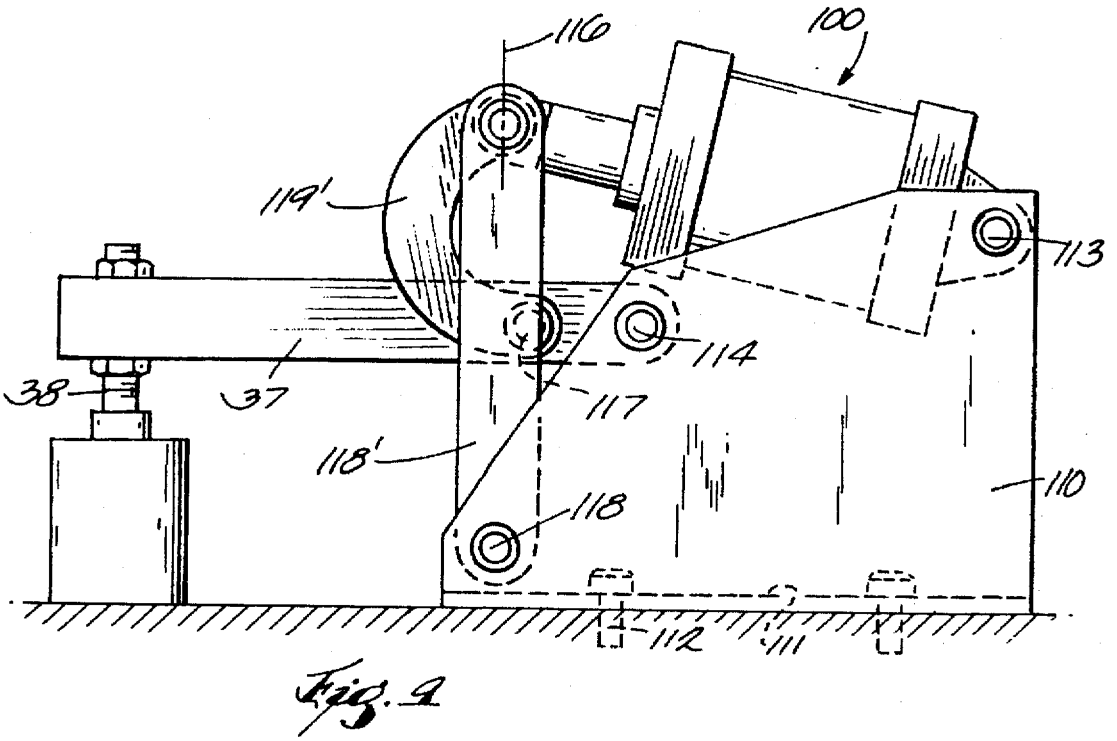
FIG. 9 is a side elevational view, of another implementation of the principles of the invention exhibited in the preceding embodiments.

The principles of the articulated resilient linkage according to the invention are implemented in the FIGS. 9 and 10 embodiment which is generally similar to the FIG. 8 embodiment except that the spring link and rigid link are mutually interchanged. Where possible, the reference numerals applied in the FIG. 8 embodiment are applied to similar parts in the FIGS. 9 and 10 embodiment.

In the FIGS. 9 and 10 embodiment the base frame has congruent side members 110 and 110' and an integral bottom member 111. The actuator 100 and pivot pins 113, 114, 116, 117 and 118 are located in the same position as in the FIG. 8 embodiment. Because the C-spring pair is connected between pins 116 and 117 in the FIGS. 9 and 10 embodiment rather than between pins 116 and 118 as in the FIG. 8 embodiment and because the illustrated configuration of the springs is different, the springs will be identified by the numeral 119. Because of the difference in the length of the links and their connecting points, the longer link pair is designated 118'. The functionality of the FIG. 8 and FIGS. 9 and 10 embodiments is essentially the same but the different embodiments are presented to show some of the various ways that the articulated resilient toggle linkage can be arranged.

It is within the purview of the invention, and those skilled in the mechanical arts will understand, that although C-shaped springs are used for demonstration purposes, other kinds of springs that are arranged for extending and contracting for stress and strain control could be used. By way of example and not limitation, cup springs, which are sometimes called Belleville springs, and helical springs could be used. Levers pivoted to the base frame could be used to drive the linkage manually instead of using fluid actuators as force generators. The clamps can be designed for handling or developing various forces by changing the constants of the springs, if C-springs are used.

Although embodiments of the principles of the invention have been described in considerable detail, such description is intended to be illustrative rather than limiting, for the invention may be variously embodied and is to be limited only by the interpretation of the claims which follow.

I claim:

1. A toggle clamp comprising:

a frame including a hole, a pin carried within the hole with clearance for movement therein, a clamping arm carried by the pin for movement between a clamped position to clamp an article and an unclamped position to unclamp an article, an actuator device controllable to provide a driving force, a link having one end portion coupled to the actuator device and an opposite end portion pivotally coupled to the clamping arm at a location spaced from the pin to convey the driving force from the actuator device to move the clamping arm between the clamped and unclamped positions, a spring having one end portion coupled to the pin and an opposite end portion coupled to the frame, a slider element coupled to the actuator device, and a track on the base on which the slider element is guided for reciprocating linearly.

2. A toggle clamp according to claim 1 wherein the opposite end portion of the spring is fixedly coupled to the frame.

3. A toggle clamp according to claim 1 or 2 wherein the spring has a generally C-shaped configuration.

4. A clamp comprising:

a support member having spaced apart elongated holes, a pin extending across the space between the holes and having ends extending oppositely of each other through the holes, respectively, the pin being smaller than the holes so the pin can shift in the holes, a clamping arm having a free end portion and a drivable end portion, the clamping arm mounted on said pin intermediate of the end portions for pivoting in one angular direction for the free end portion to apply a compressive clamping force on an article and pivotal in the opposite angular direction for releasing the article, a driven member constructed and arranged for movement in first and second directions to apply a driving force, a toggle link pivotally connected to the driven member and to the drivable end portion of the clamping arm such that when the driven member moves in the first direction the clamping arm is pivoted by the link in the one angular direction for applying a clamping force to the article and when the driven member moves in the second direction the clamping arm is pivoted by the link in the opposite angular direction for releasing the article, a spring constructed and arranged for supporting the pin such that when the clamping arm is clamping an article and a stress in excess of a predetermined stress is developed in the clamping arm, the spring yields and the pin shifts in the elongated holes to relieve the excess stress.

5. A clamp according to claim 4 wherein the spring comprises two C-shaped spring members fixed at one end to the pin.

6. A clamp according to claim 4 wherein the driven member is a slider member, further including a guide track on the support member arranged to guide the slider member to move rectilinearly, and wherein the toggle link is pivotally connected to the slider member.

7. A clamp according to claim 6 wherein the guide track is a groove in the support member, and wherein the slider member slides in the groove.

8. A clamp according to claim 4 or 5 or 6 or 7 and further including a holding element extending a distance from the free end portion of the clamping arm, and an adjusting member to adjust the distance to provide for holding objects of different sizes.

9. A clamp comprising:

a base including spaced apart side members each having an elongated slot aligned with the other, a pin extending across the space between the side members, the pin having opposite ends which extend through the slots beyond the respective side members, such that the pin is able to shift in the slots, a clamping arm having a clamping end portion and a driven end portion, said arm being mounted to the pin between the clamping end portion and the driven end portion for swinging between a clamping position and an unclamping position, a pair of C-shaped springs anchored, respectively, to the base and having end portions fastened to the respective opposite ends of the pin, a driven member movable in opposite directions and guide means for guiding the driven member to move rectilinearly, and a pair of toggle links having opposite ends, one corresponding end of each toggle link pivotally connected to the driven end portion of the clamping arm and the other end pivotally connected to the driven member such that, when the toggle links are driven in one direction to a toggled position, the toggle links force the clamping arm to swing to the clamping position to clamp an article, stress in the toggle links being limited by deflection of the C-shaped springs and shifting of the pin in the holes.

10. A clamp according to claim 9 wherein the driven member includes a slider member, and wherein the side members have a groove in which the slider member moves and is guided.

11. A clamp according to claim 9 or 10 and further including a clamping element extending a distance from the clamping end portion of the clamping arm, and an adjusting member to adjust the distance to provide for clamping articles of different sizes.

12. A clamp according to claim 10 including a force producing device operatively connected to the slider member.

13. A clamp according to claim 9 including a force producing device operatively connected to the driven member.

14. A clamp comprising:

a base including two spaced apart side members each having spaced apart pairs of slots, the side members arranged for the slots of the pair in one side member aligned with the corresponding slots of the pair in the other side member, pins spanning the space between each side member, said pins having end portions extending through said slots, to allow the pins to shift in the slots, a pair of clamp arms each having a free end portion for cooperating to clamp an article and each having a corresponding driven end portion, said clamp arms mounted on the respective pins intermediate of said ends for the clamp arms to swing about the axes of the pins, respectively, between corresponding unclamp positions and clamp positions, a pair of C-shaped springs arranged adjacent each side member each spring having opposite ends connected fixedly to said end portions of the respective pins that extend through said slots, said springs being anchored intermediate of their ends to said side members, a driven slider member and means for guiding the slider member for moving rectilinearly in opposite directions, a pair of toggle links having opposite ends, corresponding ends of both links pivotally connected to said slider member and the opposite corresponding ends of the links pivotally connected to said driven end portions of the respective clamping arms such that when the toggle links are driven in one direction to an untoggled position the links force the clamping arms to swing to unclamp positions and when the toggle links are driven in an opposite direction to a toggled position the links force the clamp arms to swing to said clamp angular positions to clamp an article, the stress in the toggle links then being limited by the spring members deflecting and shifting the pins in said slots.

15. The clamp according to claim 14 wherein said slider member is guided by sliding in parallel grooves in said side members.

16. A toggle clamp comprising:

a frame including a slot, a pin carried within the slot, a clamping arm carried by the pin for movement between a clamped position to clamp an article and an unclamped position to unclamp an article, an actuator device controllable to provide a driving force, a link having one end portion coupled to the actuator device and an opposite end portion coupled to the clamping arm to convey the driving force from the actuator device to move the clamping arm between the clamped and unclamped positions, a spring having one end portion coupled to the pin and an opposite end portion coupled to the frame to exert a bias force normally biasing the clamping arm toward the clamped position, the spring being free of direct connection to the actuator device, and the slot being sized to accommodate movement of the pin within the slot in opposition to the bias force of the spring in response to external stress on the clamping arm.

17. A toggle clamp according to claim 16 wherein the spring comprises a C-shaped spring.

18. A toggle clamp according to claim 16 wherein the pin has opposite end portions, wherein the frame includes a pair of slots each carrying a respective opposite end of the pin, and wherein the spring comprises first and second spring elements each attached to a respective opposite end of the pin.

19. A toggle clamp according to claim 18 wherein at least one of the first and second spring elements comprises a C-shaped spring.

20. A toggle clamp according to claim 16 wherein the spring is releasable for exchange with another spring to change the bias force.

* * * * *